US012560822B2

(12) United States Patent
Yonebayashi

(10) Patent No.: US 12,560,822 B2
(45) Date of Patent: Feb. 24, 2026

(54) LIQUID CRYSTAL PANEL AND DISPLAY DEVICE

(71) Applicant: Sharp Display Technology Corporation, Kameyama (JP)

(72) Inventor: Ryo Yonebayashi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/781,011

(22) Filed: Jul. 23, 2024

(65) Prior Publication Data

US 2025/0102824 A1 Mar. 27, 2025

(30) Foreign Application Priority Data

Sep. 25, 2023 (JP) ................................. 2023-160195

(51) Int. Cl.
| | |
|---|---|
| *G02B 30/25* | (2020.01) |
| *G02F 1/1333* | (2006.01) |
| *G02F 1/1335* | (2006.01) |
| *G02F 1/1339* | (2006.01) |
| *G02F 1/1343* | (2006.01) |
| *G02F 1/1347* | (2006.01) |

(52) U.S. Cl.
CPC ....... *G02B 30/25* (2020.01); *G02F 1/133388* (2021.01); *G02F 1/133512* (2013.01); *G02F 1/1339* (2013.01); *G02F 1/134309* (2013.01); *G02F 1/13439* (2013.01); *G02F 1/1347* (2013.01)

(58) Field of Classification Search
None
See application file for complete search history.

(56) References Cited

U.S. PATENT DOCUMENTS

| | | | |
|---|---|---|---|
| 2003/0020864 A1* | 1/2003 | Yanagawa ......... | G02F 1/133707 349/155 |
| 2008/0239225 A1* | 10/2008 | Chen .................. | G02F 1/13394 349/139 |
| 2009/0147186 A1* | 6/2009 | Nakai ................. | G02F 1/13471 345/89 |

FOREIGN PATENT DOCUMENTS

| | | | | | |
|---|---|---|---|---|---|
| CN | 105093750 A | * | 11/2015 | ....... | G02F 1/134309 |
| JP | 2013-050566 A | | 3/2013 | | |
| WO | WO-2015188418 A1 | * | 12/2015 | ....... | G02F 1/136286 |

* cited by examiner

*Primary Examiner* — Shan Liu
(74) *Attorney, Agent, or Firm* — ScienBiziP, P.C.

(57) ABSTRACT

A liquid crystal panel includes: a display region, and a picture-frame region provided around the display region; and a first substrate, a second substrate disposed across from the first substrate, and a liquid crystal layer and a plurality of spacers disposed between the first substrate and the second substrate. Either the first substrate or the second substrate has a picture-frame wire disposed in the picture-frame region, and the first substrate has: a transparent conductive layer; and a metal wire extending from the picture-frame wire toward the display region, and electrically connected to the transparent conductive layer in regions overlapping with the plurality of spacers in plan view.

7 Claims, 5 Drawing Sheets

10

(TO VIEWING FACE)

11
12
13

Z (TO BACK FACE)

11

1AA   1S   2S

100NL
1NA 3S        4S y x

LIQUID CRYSTAL PANEL AND DISPLAY DEVICE

CROSS-REFERENCE TO RELATED APPLICATION

The present application claims priority from Japanese Application JP2023-160195, the content of which is hereby incorporated by reference into this application.

BACKGROUND OF THE INVENTION

1. Field of the Invention

The present disclosure relates to a liquid crystal panel and a display device.

2. Description of the Related Art

An image display panel described in Japanese Unexamined Patent Application Publication No. 2013-050566 is a conventionally known example of a liquid crystal panel. The image display panel described in Japanese Unexamined Patent Application Publication No. 2013-050566 has many pixels arranged therein. The image display panel includes a partition pattern that partitions the pixels, and the partition pattern includes many boundary line segments extending between two branch points and defining the pixels. The partition pattern has an average number N of the boundary line segments extending from one branch point, which is represented by $3.0 \leq N < 4.0$. In addition, the partition pattern includes a region in which no pixels are arranged in a direction of repeating periodicity.

SUMMARY OF THE INVENTION

A proposed three-dimensional display method is applied to a display device having two liquid crystal panels stacked together. One of the liquid crystal panels (an image display panel) to the back face alternately displays a left-eye image and a right-eye image, and the other liquid crystal panel to the viewing face controls a polarization state of each of the images. The left-eye image and the right-eye image are separated from each other and presented to a viewer, using polarizing eye-glasses. The liquid crystal panel to the viewing face, which functions as what is called an active retarder, is also referred to as an active retarder panel. Hence, a display device that delivers different images to the left eye and the right eye with time-division duplexing to give the viewer a sense of depth is referred to as an active-retarder three-dimensional display device.

FIG. 9 is a schematic plan view illustrating a configuration of a conventional active retarder panel. The active retarder panel includes, for example, a liquid crystal layer and a pair of electrodes (a pixel electrode and a common electrode) that applies a voltage to the liquid crystal layer. The pixel electrode and the common electrode are transparent electrodes having relatively high resistance. FIG. 9 illustrates an active retarder panel 11R including a pixel electrode (a segment electrode) or a common electrode (a COM electrode). Although depending on the number of divisions, the pixel electrode or the common electrode is divided into, for example, a size of one fraction of a display region 1AA. Specifically, as illustrated in FIG. 9, the pixel electrode or the common electrode is divided into a first segment 1S, a second segment 2S, a third segment 3S, and a fourth segment 4S.

The active retarder panel 11R has a picture-frame region 1NA that can be provided with a picture-frame wire 100NL; that is, a metal wire having low resistance. Hence, the transparent electrodes (the pixel electrode and the common electrode) have a region positioned close to an outer periphery within the display region 1AA and quickly supplied with signals from the picture-frame wire 100NL. However, to a position far from the picture-frame wire 100NL (close to a center of the display region 1AA), the signals have to be input only through the transparent electrodes (the pixel electrode and the common electrode) having high resistance as described above, and the high resistance is likely to cause a delay of the signals.

Furthermore, if the pixels are divided into three or more, some pixels inevitably has no more than two sides in contact with the picture-frame wire 100NL on the outer periphery. In such a case, the delay is more significant. For example, if the pixels are divided into four (i.e., divided into four segments), as illustrated in FIG. 9, the first segment 1S and the fourth segment 4S are supplied with signals from three sides; whereas, the second segment S2 and the third segment S3 are supplied with signals only from two sides. In the first segment 1S and the fourth segments 4S, even the center portions are close to the picture-frame wire 100NL, and the delay is not significant. However, the center portions of the second segment 2S and the third segment 3S are far from the picture-frame wire 100NL, and are likely to cause a delay in input of the signals.

As can be seen, the active retarder panel 11R could cause a signal delay such as a delay of signals to be input to the pixel electrode and an extra time period taken when a potential fluctuating because of noise generated at the common electrode is brought back to the original potential.

Japanese Unexamined Patent Application Publication No. 2013-050566 fails to disclose a liquid crystal panel that reduces a signal delay.

The present invention is devised in view of the above circumstances, and sets out to provide a liquid crystal panel that reduces a signal delay, and a display device including the liquid crystal panel.

(1) An embodiment of the present invention is directed to a liquid crystal panel including: a display region, and a picture-frame region provided around the display region; and a first substrate, a second substrate disposed across from the first substrate, and a liquid crystal layer and a plurality of spacers disposed between the first substrate and the second substrate, wherein either the first substrate or the second substrate has a picture-frame wire disposed in the picture-frame region, and the first substrate has: a transparent conductive layer; and a metal wire extending from the picture-frame wire toward the display region, and electrically connected to the transparent conductive layer in regions overlapping with the plurality of spacers in plan view.

(2) An embodiment of the present invention according to the configuration (1) is directed to a liquid crystal panel. Either the first substrate or the second substrate includes a plurality of light blocking portions overlapping with the plurality of spacers in plan view, and disposed closer to a viewing face than the plurality of spacers and the metal wire. The metal wire is electrically connected to the transparent conductive layer in the regions overlapping with the plurality of spacers and the plurality of light blocking portions in plan view.

(3) An embodiment of the present invention according to the configuration (1) or (2) is directed to a liquid crystal panel. The transparent conductive layer is divided into three or more segments in one direction of the liquid crystal panel.

(4) An embodiment of the present invention according to any one of the configurations (1), (2), and (3) is directed to a liquid crystal panel. In plan view, the metal wire is shaped into a mesh form, using the regions serving as hubs and overlapping with the plurality of spacers.

(5) An embodiment of the present invention according to any one of the configurations (1), (2), (3), and (4) is directed to a liquid crystal panel. In plan view, the metal wire is shaped into a mesh form, using the regions, all of which serve as hubs and overlap with the plurality of spacers.

(6) An embodiment of the present invention according to any one of the configurations (1), (2), (3), and (4) is directed to a liquid crystal panel. In plan view, the metal wire is shaped into a mesh form, using the regions, a proportion of which serve as hubs and overlap with the plurality of spacers.

(7) An embodiment of the present invention according to any one of the configurations (1), (2), and (3) is directed to a liquid crystal panel. In plan view, the metal wire extends only in one direction, using the regions serving as hubs and overlapping with the plurality of spacers.

(8) An embodiment of the present invention according to the configuration (1) or (7) is directed to a liquid crystal panel. The transparent conductive layer is divided into three or more segments in a first direction of the liquid crystal panel. In plan view, the metal wire extends in a second direction perpendicular to the first direction, using the regions serving as hubs and overlapping with the plurality of spacers, the metal wire not extending in the first direction.

(9) An embodiment of the present invention according to the configuration (8) is directed to a liquid crystal panel. The metal wire and the second direction form an angle of 45° or less.

(10) An embodiment of the present invention according to any one of the configurations (1), (2), (3), (4), (5), (6), (7), (8), and (9) is directed to a liquid crystal panel. The plurality of spacers are disposed at random.

(11) An embodiment of the present invention is directed to a display device including: the liquid crystal panel according to any one of the configurations (1), (2), (3), (4), (5), (6), (7), (8), (9), and (10); an image display panel disposed to the liquid crystal panel toward a back face; and a backlight disposed to the image display panel toward the back face.

The present invention can provide a liquid crystal panel that reduces a signal delay, and a display device including the liquid crystal panel.

BRIEF DESCRIPTION OF THE DRAWINGS

FIG. 4 is an enlarged schematic plan view of a region surrounded by a broken line in

FIG. 2;

DETAILED DESCRIPTION OF THE INVENTION

Embodiments of the present invention will be described below. The present invention shall not be limited to the embodiments below, and the designs presented in the embodiments can be appropriately modified within a scope of the configurations of the present invention. Note that identical reference signs are appropriately used to denote identical or substantially identical components among the drawings. Such components will not be repeatedly elaborated upon. Aspects of the present invention may be appropriately combined unless otherwise departing from the scope of the present invention.

In this specification, the term "viewing face" means a face closer to the screen (the display surface) of a liquid crystal display device, and the term "back face" means a face farther away from the screen (the display surface) of the liquid crystal display device.

First Embodiment

Figure 1:
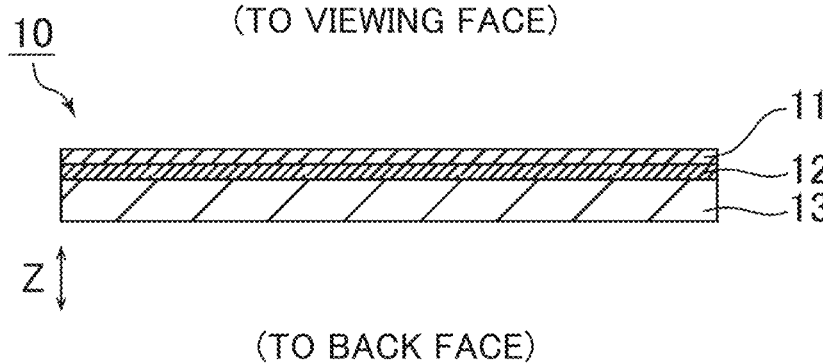
FIG. 1 is a schematic cross-sectional view of a display device according to a first embodiment.

FIG. 1 is a schematic cross-sectional view of a display device according to a first embodiment. The first embodiment will be described with reference to FIGS. 1 to 6. This embodiment describes a display device 10 as an example. Note that x, y, and y axes are illustrated in a portion of each of the drawings, and the axes indicate the respective directions in each drawing.

The display device 10 according to this embodiment is a kind of a 3D image display device that allows a user to visually recognize a 3D image (a stereoscopic image). The display device 10 is an active retarding display device. As illustrated in FIG. 1, the display device 10 includes: a liquid crystal panel 11; an image display panel 12 disposed to the liquid crystal panel 11 toward the back face; and a backlight 13 disposed to the image display panel 12 toward the back face.

The image display panel 12 has a function of displaying an image.

The backlight 13 is an external light source that emits light, to be used for displaying an image, to the image display panel 12. The backlight 13 includes: a light source (e.g., an LED) that emits a white light; and an optical member that applies an optical action to the light from the light source to convert the light into a planar light.

The liquid crystal panel 11 functions as a modulator for converting a linearly polarized light emitted from the image display panel 12 into a circularly polarized light. Specifically, the liquid crystal panel 11 can switch between a circularly polarized right light and a circularly polarized left light in synchronization with the image display panel 12 on which a right-eye image and a left-eye image are alternately displayed. That is, the liquid crystal panel 11 functions as an active retarder panel.

The display device 10 of this embodiment is used in combination with circularly polarized eyeglasses including circularly polarized films through which light travels in reverse directions between left and right. The user wears the circularly polarized eyeglasses and views the display device 10, so that he or she can visually recognize a 3D image. As can be seen, the liquid crystal panel 11 is driven at high speed in synchronization with the image display panel 12 displaying an image. Hence, the liquid crystal panel 11 is required to reduce a signal delay.

Figure 2:
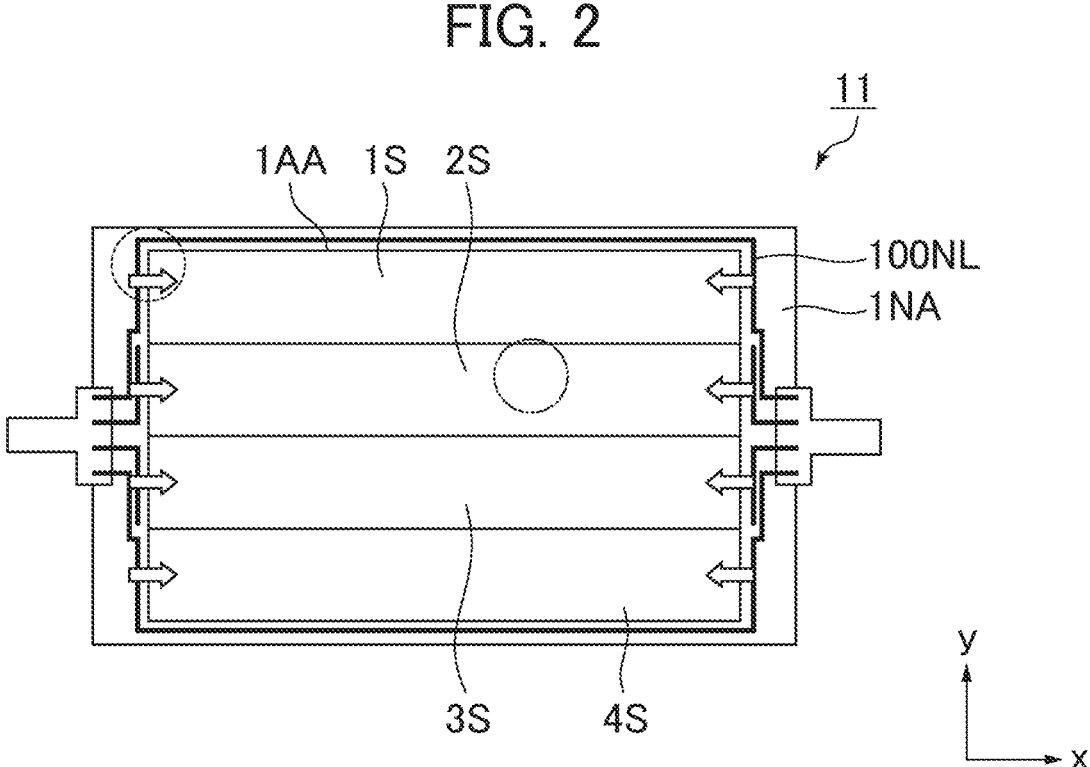
FIG. 2 is a schematic plan view of a liquid crystal panel according to the first embodiment.
Figure 3:
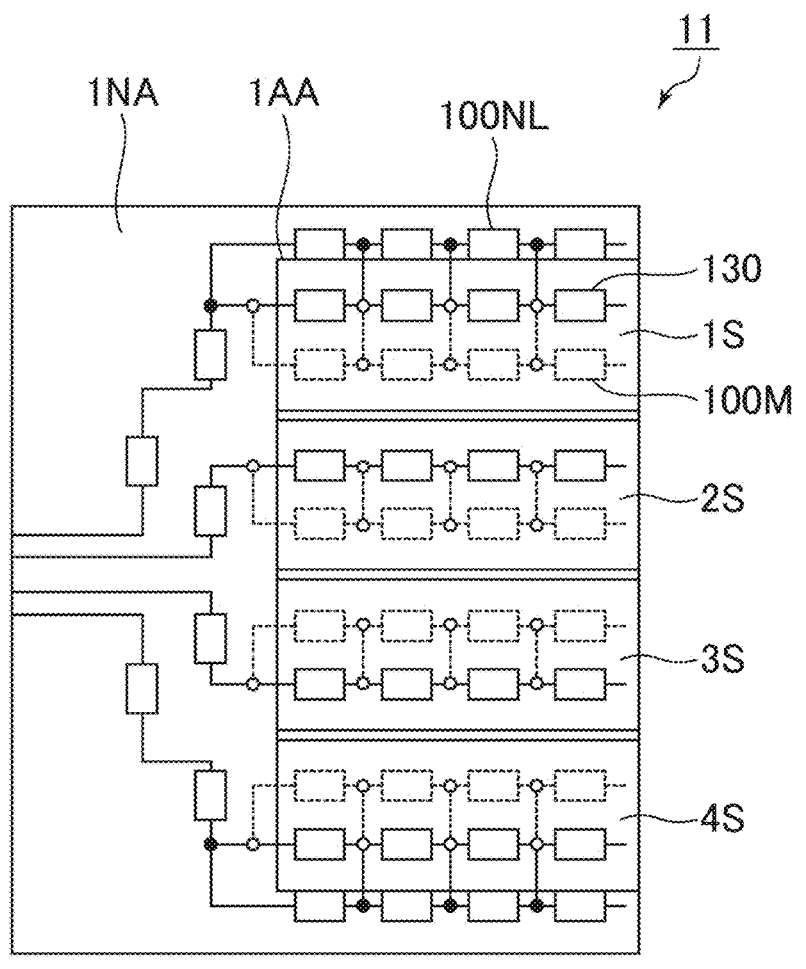
FIG. 3 is an equivalent circuit diagram of the liquid crystal panel according to the first embodiment.
Figure 4:
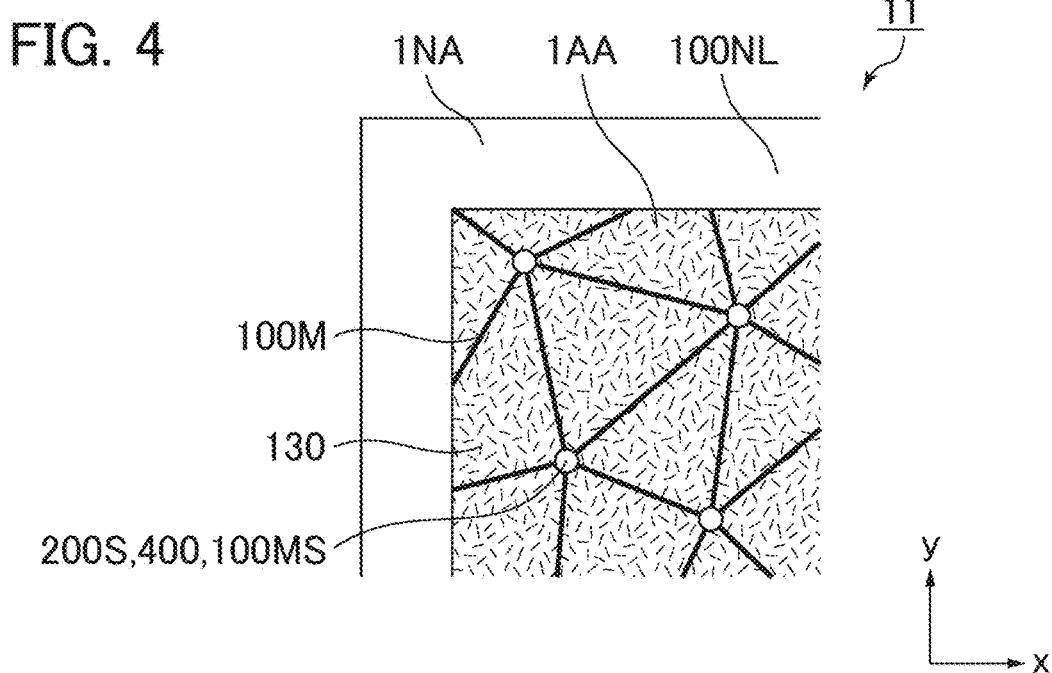
Figure 5:
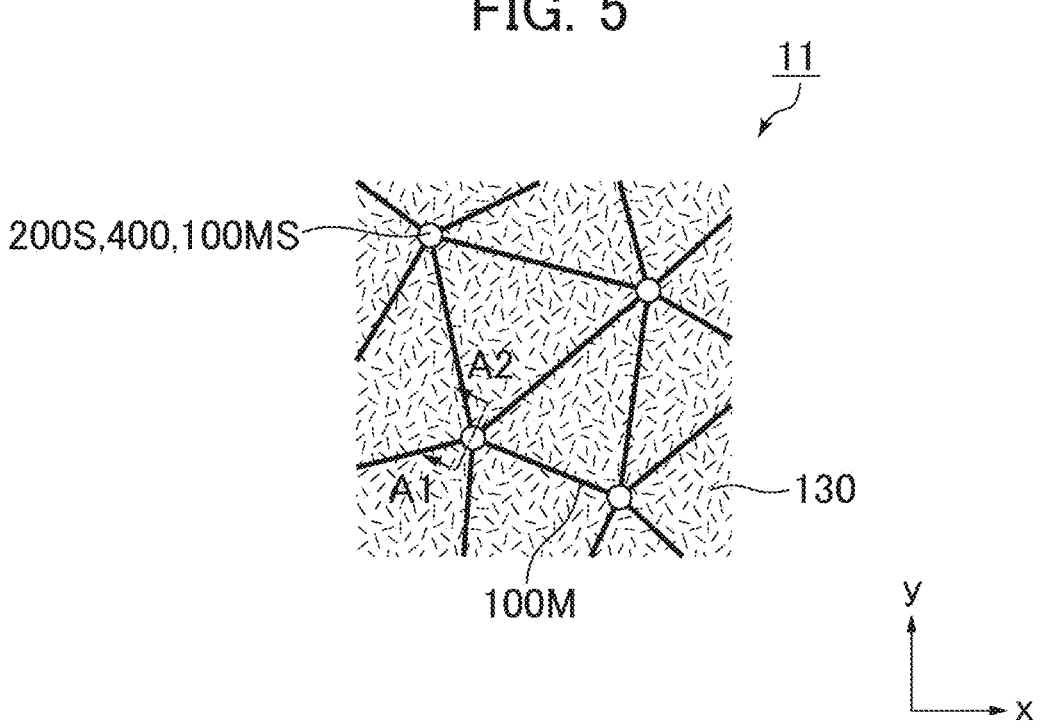
FIG. 5 is an enlarged schematic plan view of a region surrounded by a dot-and-dash line in FIG. 2.
Figure 6:
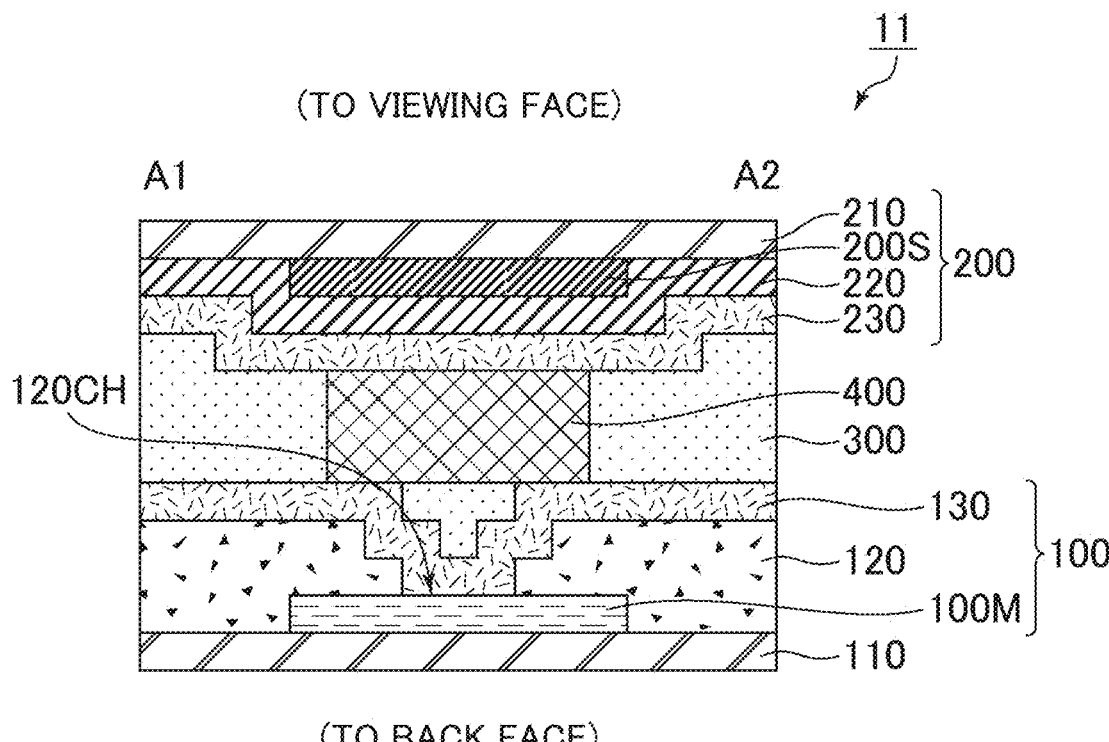
FIG. 6 is a schematic cross-sectional view taken along line A1-A2 in FIG. 5.

FIG. 2 is a schematic plan view of a liquid crystal panel according to the first embodiment. FIG. 3 is an equivalent circuit diagram of the liquid crystal panel according to the first embodiment. FIG. 4 is an enlarged schematic plan view of a region surrounded by a broken line in FIG. 2. FIG. 5 is an enlarged schematic plan view of a region surrounded by a dot-and-dash line in FIG. 2. FIG. 6 is a schematic cross-sectional view taken along line A1-A2 in FIG. 5.

As illustrated in FIGS. 2 to 6, the liquid crystal panel 11 of this embodiment includes: a display region 1AA; a picture-frame region 1NA provided around the display region 1AA; a first substrate 100; a second substrate 200 disposed across from the first substrate 100; and a liquid crystal layer 300 and a plurality of spacers 400 disposed between the first substrate 100 and the second substrate 200. Either the first substrate 100 or the second substrate 200 has a picture-frame wire 100NL disposed in the picture-frame region 1NA. The first substrate 100 has: a first transparent conductive layer 130 serving as the transparent conductive layer; and a metal wire 100M extending from the picture-frame wire 100NL toward the display region 1AA, and electrically connected to the first transparent conductive layer 130 in regions overlapping with the plurality of spacers 400 in plan view. As can be seen, the metal wire 100M, which is electrically connected to the first transparent conductive layer 130 and the picture-frame wire 100NL, can decrease effective surface resistance of the first transparent conductive layer 130 and reduce a signal delay.

With reference to FIG. 3, the liquid crystal panel 11 of this embodiment will be described in detail. If the metal wire 100M is not disposed, the picture-frame region 1NA has picture-frame wires 100NL with low resistance; however, the display region 1AA has the first transparent electrode layer 130 alone; that is, a transparent electrode with high resistance. In FIG. 3, the first segment 1S and the fourth segment 4S respectively have an upper side and a lower side provided with picture-frame wires 100NL with low resistance. Hence, the right-left sides and the centers of the first segment 1S and the fourth segment 4S are readily supplied with signals. However, the second segment 2S and the third segment 3S have neither an upper side nor a lower side, and are provided with highly resistive paths (the first transparent conductive layer 130) alone as input paths of signals. Such a configuration is likely to cause a signal delay. Hence, as illustrated in FIG. 3 by broken lines, the liquid crystal panel 11 of this embodiment includes metal wires 100M arranged in parallel with one another and serving as signal paths with low resistance. Such a feature can reduce combined resistance. Described below will be the display device 10 of this embodiment.

As illustrated in FIG. 2, the liquid crystal panel 11 of this embodiment includes: the display region 1AA; and the picture-frame region 1NA provided around the display region 1AA. The display region 1AA may be any given region as long as a phase difference can be controlled in the region. The display region 1AA is a region in which a pixel electrode to be described later is disposed. In the display region 1AA, alignment of liquid crystal molecules is changed in accordance with the magnitude of a voltage applied to the liquid crystal layer 300, so that a phase difference of the liquid crystal layer 300 is controlled.

As illustrated in FIG. 6, the liquid crystal panel 11 of this embodiment includes: the first substrate 100; the second substrate 200 disposed across from the first substrate 100; and the liquid crystal layer 300 and the plurality of spacers 400 sandwiched between the first substrate 100 and the second substrate 200. This embodiment exemplifies a case where the first substrate 100, the liquid crystal layer 300, the plurality of spacers 400, and the second substrate 200 are sequentially arranged from toward the back face to toward the viewing face. Alternatively, the second substrate 200, the liquid crystal layer 300, the plurality of spacers 400, and the first substrate 100 may be sequentially arranged from toward the back face to toward the viewing face.

As illustrated in FIGS. 2 and 4, either the first substrate 100 or the second substrate 200 has the picture-frame wire 100NL disposed in the picture-frame region 1NA. The picture-frame wire 100NL may be electrically conductive. The picture-frame wire 100NL is electrically connected to the metal wire 100M in the picture-frame region 1NA. The picture-frame wire 100NL is a trunk line of the metal wire 100M. The picture-frame wire 100NL is, for example, a source line, a gate line, a segment signal line, or a common signal line. The segment signal line is, for example, a wire that is electrically connected to the pixel electrode and supplies a segment signal to the segment electrode. The common signal line is, for example, a wire that is electrically connected to the common electrode and supplies a common signal to the common electrode.

The picture-frame wire 100NL is preferably disposed to the first substrate 100. Such a feature makes it possible to readily connect the picture-frame wire 100NL and the metal wire 100M together.

The picture-frame wire 100NL contains, for example, such a metal as copper, titanium, aluminum, molybdenum, or tungsten. Alternatively, the picture-frame wire 100NL contains an alloy of such metals. The metal wire 100M is formed of either a metal such as copper, titanium, aluminum, molybdenum, or tungsten, or an alloy of such metals. The metal or the alloy is deposited in a single layer or a multilayer by, for example, sputtering, and, then, patterned by, for example, photolithography to form the metal wire 100M.

The picture-frame wire 100NL has a resistivity of preferably $1.0 \times 10^{-6}$ $\Omega \cdot$cm or more and $3.0 \times 10^{-4}$ $\Omega \cdot$cm or less, more preferably $1.0 \times 10^{-6}$ $\Omega \cdot$cm or more and $3.0 \times 10^{-5}$ $\Omega \cdot$cm or less, and still more preferably $1.0 \times 10^{-6}$ $\Omega \cdot$cm or more and $3.0 \times 10^{-6}$ $\Omega \cdot$cm or less. Such a feature makes it possible to effectively reduce a signal delay.

The picture-frame wire 100NL is preferably higher in resistance than the metal wire 100M. Such a feature makes it possible to effectively reduce a signal delay.

As illustrated in FIG. 6, the first substrate 100 includes: a first support substrate 110; the metal wire 100M; a first insulating layer 120; and a first transparent conductive layer 130, all of which are arranged in the stated order toward the liquid crystal layer 300. The second substrate 200 includes: a second support substrate 210; a plurality of light blocking portions 200S; a second insulating layer 220; and a second transparent conductive layer 230, all of which are arranged in the stated order toward the liquid crystal layer 300. In this specification, the term "transparent" means that the total transmittance is 90% or higher and 100% or lower. Preferably, the total transmittance is 95% or higher and 100% or lower, and more preferably, 98% or higher and 100% or lower. The total transmittance is determined by JIS K7361-1.

One of the first transparent conductive layer 130 and the second transparent conductive layer 230 is a pixel electrode, and the other is a common electrode. The liquid crystal panel 11 of this embodiment is a vertical-electric-field liquid crystal panel in which one of the first substrate 100 and the second substrate 200 has the pixel electrode, the other has the common electrode, and the pixel electrode and the common electrode hold therebetween the liquid crystal layer 300. When a vertical electric field is applied to the liquid crystal layer 300, the liquid crystal layer 11 displays an image. Examples of the vertical electric field technique include vertical alignment (VA) in which liquid crystal molecules in a liquid crystal layer are aligned vertically to a substrate surface when no voltage is applied.

Note that this embodiment describes a case where the second transparent conductive layer 230 is disposed in the second substrate 200. However, the second transparent conductive layer 230 may be disposed in the first substrate 100. In such a case, the liquid crystal panel 11 is a horizontal-electric-field liquid crystal panel. When a horizontal electric field is applied to the liquid crystal layer 300, the liquid crystal layer 11 displays an image. Examples of the horizontal electric field technique include the fringe field switching (FFS) mode and the in-plane switching (IPS) mode in which liquid crystal molecules in a liquid crystal layer are aligned in parallel with a substrate surface when no voltage is applied.

Either the first substrate 100 or the second substrate 200 includes, for example: a plurality of gate lines provided on a support substrate (either the first support substrate 110 or the second support substrate 210) and extending in parallel with one another; and a plurality of source lines provided through an insulating film and extending in parallel with one another in a direction intersecting with the gate lines. The plurality of gate lines and the plurality of source lines are provided in the display region 1AA. The plurality of gate lines and the plurality of source lines are formed in a grid pattern as a whole so as to partition each of the pixels. For example, an intersection of each source line and each gate line is provided with a thin-film transistor (TFT) serving as a switch element.

The pixel electrode is, for example, disposed in each region surrounded with a pair of adjacent source lines and a pair of adjacent gate lines. For example, the pixel electrode is set to a potential corresponding to a data signal supplied through a corresponding TFT. The common electrode is formed substantially monolithically, regardless of the boundaries of the pixels, except for a specific portion such as a connection between a pixel electrode and a drain electrode. The common electrode is supplied with a common signal maintained at a constant value, and is maintained at a constant potential.

An alignment film is disposed between the first substrate 100 and the liquid crystal layer 300 and another alignment film is disposed between the second substrate 200 and the liquid crystal layer 300, in order to control alignment of the liquid crystal molecules contained in the liquid crystal layer 300. When no voltage is applied between the pixel electrode and the common electrode, the liquid crystal molecules contained in the liquid crystal layer 300 are aligned substantially perpendicularly to a principal surface of each of the substrates in a pair.

For example, the liquid crystal panel 11 further includes: a source driver electrically connected to a source line; a gate driver electrically connected to a gate line; and a controller. The gate driver sequentially supplies scan signals to the gate line in accordance with control of the controller. When a scan signal stops applying a voltage to the TFT, the source driver supplies a data signal to the source line in accordance with control of the controller. Each of a plurality of the pixel electrodes is set to a potential based on a data signal supplied through a corresponding TFT. Between the pixel electrode and the common electrode, a vertical electric field is generated so that the alignment of the liquid crystal molecules in the liquid crystal layer is controlled. Then, in the liquid crystal panel 11, the alignment of the liquid crystal molecules is changed in accordance with the magnitude of a voltage to be applied to the liquid crystal layer 300 in each of the pixels (the first segment 1S, the second segment 2S, the third segment 3S, and the fourth segment 4S). Hence, a light transmittance of the liquid crystal layer 300 is adjusted.

Note that the liquid crystal panel 11 according to this embodiment may omit the gate line, the source line, the TFT serving as a switch element, the source driver, the gate driver, and the controller. Instead, the liquid crystal panel 11 may include a segment signal line and a common signal line. In this case, the pixel electrode is supplied with a segment signal from a drive circuit outside the panel through the segment signal line. The pixel electrode is set to a potential based on the segment signal. Similarly, the common electrode is supplied with a common signal from the drive circuit outside the panel through the common signal line. The common electrode is set to a potential based on the common signal. Hence, between the pixel electrode and the common electrode, a vertical electric field is generated so that the alignment of the liquid crystal molecules in the liquid crystal layer is controlled. Then, in the liquid crystal panel 11, the alignment of the liquid crystal molecules is changed in accordance with the magnitude of a voltage to be applied to the liquid crystal layer 300 in each of the pixels (the first segment 1S, the second segment 2S, the third segment 3S, and the fourth segment 4S). Hence, polarization of light passing through the liquid crystal layer 300 is adjusted.

Examples of the first support substrate 110 and the second support substrate 210 include insulating substrates such as a glass substrate and a plastic substrate. Examples of a material of the glass substrate include such glasses as float glass and soda glass. Examples of a material of the plastic substrate include such plastics as polyethylene terephthalate, polybutylene terephthalate, polyether sulfone, polycarbonate, and alicyclic polyolefin.

The metal wire 100M extends from the picture-frame wire 100NL toward the display region 1AA, and electrically connected to the first transparent conductive layer 130 in regions overlapping with the plurality of spacers 400 in plan view. As can be seen, as a wire to input a signal to the first transparent conductive layer 130, the metal wire 100M can be used in addition to the picture-frame wire 100NL. Such a feature can decrease effective surface resistance of the first transparent conductive layer 130 and reduce a signal delay. The metal wire 100M is electrically connected to the picture-frame wire 100NL.

The liquid crystal panel 11 of this embodiment has, for example, the metal wire 100M with low resistance. The metal wire 100M is in contact with the first transparent conductive layer 130 across the first insulating layer 120 through a contact hole 120CH. Such a feature can decrease a value of effective resistance of the first transparent conductive layer 130 and reduce a signal delay.

The first transparent conductive layer 130 is preferably higher in resistance than the metal wire 100M. Such a feature makes it possible to effectively reduce a signal delay.

The metal wire 100M has a resistivity of preferably $1.0 \times 10^{-6}$ $\Omega \cdot cm$ or more and $3.0 \times 10^{-4}$ $\Omega \cdot cm$ or less, more preferably $1.0 \times 10^{-6}$ $\Omega \cdot cm$ or more and $3.0 \times 10^{-5}$ $\Omega \cdot cm$ or less, and still more preferably $1.0 \times 10^{-6}$ $\Omega \cdot cm$ or more and $3.0 \times 10^{-6}$ Ω·cm or less. Such a feature makes it possible to effectively reduce a signal delay.

Preferably, in plan view, the metal wire 100M is shaped into a mesh form, using regions serving as hubs 100MS and overlapping with the plurality of spacers 400. Such a feature makes it possible to effectively reduce a signal delay. The mesh shape means, for example, a structure in which the metal wire 100M branches in three or more directions from each of the hubs 100MS. The metal wire 100M is branched preferably in three or more directions and seven or fewer directions from each hub 100MS, and more preferably, in four or more directions and six or fewer directions. Preferably, in plan view, the metal wire 100M is shaped into a mesh form, using regions, all of which serve as the hubs 100MS and overlap with the plurality of spacers 400. Note that the number of branches can be set independently at each hub 100MS. The number of branches may be the same for all the hubs 100MS. Alternatively, the number of branches may be different between at least some of the hubs 100MS and the other hubs 100MS.

More preferably, in plan view, the metal wire 100M is shaped into a mesh form, using regions serving as the hubs 100MS and overlapping with both the plurality of spacers 400 and the plurality of light blocking portions 200S to be described later. Such a feature makes it possible to effectively reduce a signal delay and improve display performance. More preferably, in plan view, the metal wire 100M is shaped into a mesh form, using the regions, all of which serve as the hubs 100MS and overlap with both the plurality of spacers 400 and the plurality of light blocking portions 200S.

If the first transparent conductive layer 130 is a pixel electrode, the metal wire 100M has a function of supplying an image signal to the first transparent conductive layer 130. If the first transparent conductive layer 130 is a common electrode, the metal wire 100M has a function of supplying a common signal to the first transparent conductive layer 130.

The metal wire 100M contains, for example, such a metal as copper, titanium, aluminum, molybdenum, or tungsten. Alternatively, the metal wire 100M contains an alloy of such metals. The metal wire 100M is formed of either a metal such as copper, titanium, aluminum, molybdenum, or tungsten, or an alloy of such metals. The metal or the alloy is deposited in a single layer or a multilayer by, for example, sputtering, and, then, patterned by, for example, photolithography to form the metal wire 100M.

A width of the metal wire 100M depends on an image size and a required drive speed value. For example, the width is 2 μm or more and 10 μm or less.

Each of the first insulating layer 120 and the second insulating layer 220 may be an inorganic insulating film, an organic insulating film, or a multilayer stack including the organic insulating film and the inorganic insulating film. The inorganic insulating film may be, for example, an inorganic film (a relative permittivity ε=5 to 7) formed of silicon nitride $(SiN_x)$ or silicon oxide $(SiO_2)$. Alternatively, the inorganic insulating film may be a multilayer film formed of such inorganic films. The organic insulating film may be, for example, an organic film having a small relative permittivity (a relative permittivity ε=2 to 5), such as a photosensitive acrylic resin. Alternatively, the organic insulating film may be a multilayer film of such organic films.

The first insulating layer 120 is disposed to the metal wire 100M toward the liquid crystal layer 300. Such a feature makes it possible to planarize a surface of the first substrate 100 toward the liquid crystal layer 300. If the display region

1AA includes therein a wire (e.g., the metal wire 100M of this embodiment), a thickness of the wire could affect a cell thickness. In this embodiment, the first insulating layer 120, which has the planarization effect, covers the metal wire 100M, and the first transparent conductive layer 130 is provided on the first insulating layer 120. Such a feature makes it possible to planarize the surface of the first substrate 100 toward the liquid crystal layer 300.

In plan view, the first insulating layer 120 has regions overlapping with the plurality of spacers 400, and each provided with the contact hole 120CH. Such a feature makes it possible to electrically connect together the first transparent conductive layer 130 and the metal wire 100M in the regions overlapping with the plurality of spacers 400.

At least one of the first transparent conductive layer 130 or the second transparent conductive layer 230 is a transparent electrode. The first transparent conductive layer 130 and the second transparent conductive layer 230 contain, for example, such a metal as indium tin oxide (ITO), indium zinc oxide (IZO), zinc oxide (ZnO), or tin oxide (SnO). In forming the first transparent conductive layer 130 and the second transparent conductive layer 230, a transparent conductive material such as, for example, ITO, IZO, ZnO, or SnO, or an alloy of such metals, is formed into either a single layer or a multilayer by, for example, sputtering. After that, the single layer or the multilayer is patterned by, for example, photolithography to form the first transparent conductive layer 130 and the second transparent conductive layer 230.

The liquid crystal layer 300 contains a liquid crystal material. When a voltage is applied to the liquid crystal layer 300 to change the alignment of the liquid crystal molecules in the liquid crystal material in accordance with the applied voltage, the liquid crystal layer 300 controls the amount of light to be transmitted through the liquid crystal layer 300.

As to the liquid crystal molecules, dielectric constant anisotropy (Δc), which is defined by an equation (L) below, may take either a positive value or a negative value. Note that liquid crystal molecules exhibiting positive dielectric constant anisotropy are also referred to as positive liquid crystals, and liquid crystal molecules exhibiting negative dielectric constant anisotropy are also referred to as negative liquid crystals. Note that a major axis direction of the liquid crystal molecules is a slow axis direction Furthermore, the liquid crystal molecules are homogeneously aligned in a state where no voltage is applied (i.e., in a no-voltage applied state), and, in the no-voltage applied state, the direction of the major axis of the liquid crystal molecules is also referred to as an initial alignment direction of the liquid crystal molecules.

$$\Delta\varepsilon = \text{(a dielectric constant of the liquid crystal molecules in the major axis direction)} - \text{(a dielectric constant of the liquid crystal molecules in the minor axis direction)} \quad (L)$$

The plurality of spacers 400 have a function of leaving a clearance for a space in which the liquid crystal layer 300 is formed. That is, the plurality of spacers 400 have a function of maintaining a cell thickness (i.e., a thickness of the liquid crystal layer 300). Each of the spacers 400 is shaped into, for example, a column. A planar shape of each spacer 400 may be, for example, polygonal, circular, or elliptical. Note that the spacer 400 may also be referred to as a photo spacer (PS).

Each spacer 400 preferably contains, for example, a cured photosensitive resin product. Example of the photosensitive resin includes a resin having an ultraviolet reactive functional group.

Furthermore, preferably, the plurality of spacers 400 included in the liquid crystal panel 11 are disposed in positions where moiré patterns are not likely to be produced between the spacers 400 and light blocking patterns of the image display panel 12 disposed toward the back face. Such a feature makes it possible to reduce moiré patterns to be produced when the metal wire 100M is disposed. If the plurality of spacers 400 are unlikely to produce moiré patterns with the light blocking patterns of the image display panel 12, the metal wire 100M, which is a wire connecting together patterns of the plurality of spacers 400, is also considered to successfully exhibit an advantageous effect of producing fewer moiré patterns. Note that the light blocking patterns of the image display panel 12 are light blocking members overlapping with a plurality of spacers that the image display panel 12 has in plan view and provided to the plurality of spacers, included in the image display panel 12, toward the viewing face.

The plurality of spacers 400 are preferably disposed, for example, at random. Here, the random disposition of the plurality of members (e.g., the plurality of spacers 400) means that the plurality of members are disposed without periodicity at least in a region of the liquid crystal panel 11 in plan view. For example, the plurality of members may have a repetition period, and may be disposed at random within the repetition period.

For the sake of production and working, it is highly unlikely that the plurality of members are disposed at random (without any periodicity) in the entire region of the liquid crystal panel 11 in plan view. For example, if a stepper is used for light exposure, the periodicity could be found. In this embodiment, the periodicity is allowed to some extent, and if the plurality of members are disposed at random within the period, the members are considered to be disposed at random.

Preferably, the plurality of spacers 400 have a repetition period, and are disposed at random within the repetition period. Preferably, the plurality of light blocking portions 200S have a repetition period, and are disposed at random within the repetition period. Preferably, the repetition period of the disposition of the plurality of spacers 400 is greater than the repetition period of the disposition of the plurality of light blocking portions 200S, and is non-integer multiple of the repetition period of the disposition of the plurality of light blocking portions 200S. Such a feature makes it possible to reduce interference caused between the plurality of spacers 400 and the plurality of light blocking portions 200S, thereby successfully reducing moiré patterns.

Here, the repetition period of the disposition of the plurality of spacers 400 and the repetition period of the disposition of the plurality of light blocking portions 200S are determined according to restriction of the producing apparatus and restriction for performing a realistic design work. More preferably, on the grounds of the restriction of the producing apparatus and the restriction for performing a realistic design work, the repetition period of the disposition of the plurality of spacers 400 is set greater to the extent possible than the repetition period of the disposition of the plurality of light blocking portions 200S. Such a feature makes it possible to further reduce the interference caused between the plurality of spacers 400 and the plurality of light blocking portions 200S, thereby successfully reducing more moiré patterns.

Note that this embodiment exemplifies a case where the plurality of members are disposed at random. Alternatively, the plurality of members may be disposed in another manner as long as the members are not disposed in moiré patterns.

Preferably, either the first substrate 100 or the second substrate 200 includes the plurality of light blocking portions 200S overlapping with the plurality of spacers 400 in plan view, and disposed closer to the viewing face than the plurality of spacers 400 and the metal wire 100M. Preferably, the metal wire 100M is electrically connected to the first transparent conductive layer 130 in the regions overlapping with the plurality of spacers 400 and the plurality of light blocking portions 200S in plan view. Such features make it possible to reduce a signal delay and keep misalignment of the liquid crystals out of view, thereby successfully improving display performance. The plurality of light blocking portions 200S are light blocking patterns for blocking the plurality of spacers 400 from light. In this embodiment, the hubs of the metal wire 100M correspond to the light blocking patterns.

The first insulating layer 120 includes the contact holes 120CH in the regions overlapping with the plurality of the light blocking portions 200S (i.e., the regions overlapping with both the plurality of spacers 400 and the plurality of light blocking portions 200S) in plan view. Such a feature makes it possible to electrically connect together the first transparent conductive layer 130 and the metal wire 100M in the regions overlapping with the plurality of light blocking portions 200S (i.e., the regions overlapping with both the plurality of spacers 400 and the plurality of light blocking portions 200S).

As can be seen, the contact holes 120CH of this embodiment are disposed directly below the plurality of light blocking portions 200S. Level differences of the contact holes 120CH cause misalignment of the liquid crystals. Hence, the contact holes 120CH are disposed directly below the plurality of light blocking portions 200S. Such a feature can reduce deterioration in display quality.

The contact holes 120CH, in which the first transparent conductive layer 130 and the metal wire 100M are connected together, are a cause of the misalignment of the liquid crystals. Hence, preferably, the contact holes 120CH are blocked from light. Preferably, the metal wire 100M of this embodiment is: disposed so that the plurality of light blocking portions 200S, which serve as the light blocking patterns to block the plurality of spacers 400 of the liquid crystal panel 11 from light, serve as the hubs; and electrically connected to the first transparent conductive layer 130 in positions overlapping with the plurality of light blocking portions 200S. Such a feature makes it possible to keep, out of view, misalignment of the liquid crystals caused by the contact holes 120CH, thereby successfully improving display performance.

Note that, in FIG. 6, the first substrate 100 is disposed toward the back face, the second substrate 200 is disposed toward the viewing face, and the second substrate 200 includes the plurality of light blocking portions 200S. However, the plurality of light blocking portions 200S may be disposed in any given manner. If the first substrate 100 is disposed toward the viewing face and the second substrate 200 is disposed toward the back face, for example, the first substrate 100 includes the plurality of light blocking portions 200S. Specifically, in the first substrate 100, the plurality of light blocking portions 200S are disposed to the metal wire 100M toward the viewing face.

Similar to the plurality of spacers 400, preferably, the plurality of light blocking portions 200S included in the liquid crystal panel 11 are disposed in positions where moiré patterns are unlikely to be produced between the light blocking portions 200S and light blocking patterns of the image display panel 12 disposed toward the back face. Such a feature makes it possible to reduce moiré patterns to be produced when the metal wire 100M is disposed. If the plurality of light blocking portions 200S are unlikely to produce moiré patterns with the light blocking patterns of the image display panel 12, the metal wire 100M, which is a wire connecting together patterns of the plurality of light blocking portions 200S, is also considered to successfully exhibit an advantageous effect of producing fewer moiré patterns.

Preferably, the plurality of light blocking portions 200S are disposed, for example, at random. Note that this embodiment exemplifies a case where the plurality of light blocking portions 200S are disposed at random. Alternatively, the light blocking portions 200S may be disposed in another manner as long as moiré patterns can be avoided.

As can be seen, the liquid crystal panel 11 of this embodiment includes: the plurality of spacers 400; and the plurality of light blocking portions 200S serving as light blocking patterns of the plurality of spacers 400. The liquid crystal panel 11 further includes the metal wire 100M: disposed below a monolithic transparent electrode (the first transparent conductive layer 130 in this embodiment) across the first insulating layer 120; and electrically connected to the first transparent conductive layer 130 through the contact holes 120CH provided to the first insulating layer 120. The metal wire 100M is disposed so that at least a proportion of the plurality of light blocking portions 200S, which serve as the light blocking patterns of the plurality of spacers 400, serve as the hubs, and contacts between the metal wire 100M and the first transparent conductive layer 130 are disposed to overlap with the plurality of light blocking portions 200S.

Here, in a display (a liquid-crystal display, a plasma display, or an electroluminescent display), moiré patterns might be produced between the periodicity of the structure of pixels and the periodicity of the optical film to be attached. When the structure of the pixels themselves is disposed at random, the moiré patterns can be avoided. However, if the structure of the pixels is disposed completely at random, the image develops unevenness of light and dark patterns. In order to overcome such a problem, the Japanese Unexamined Patent Application Publication No. 2013-050566 discloses a technique to dispose pixels toward the image display panel at random under a certain rule, so as to avoid both of moiré patterns and unevenness of light and dark patterns on the image. Hence, the Japanese Unexamined Patent Application Publication No. 2013-050566 discloses a random wiring technique. However, the technique of the Japanese Unexamined Patent Application Publication No. 2013-050566 is directed only to an image display panel, and fails to disclose an active retarder panel. Furthermore, the Japanese Unexamined Patent Application Publication No. 2013-050566 fails to clearly define a positional relationship between the spacers and the metal wire and a positional relationship between the light blocking patterns for blocking the spacers from light and the metal wire.

The first transparent conductive layer 130 is divided into three or more segments in one direction of the liquid crystal panel 11. Thanks to such a feature, the first transparent conductive layer 130 has a segment (i.e., the second segment S2 and the third segment S3 in FIG. 2) having fewer sides connected to the picture-frame region 1NA than other segments. When a signal is input from a signal line (the picture-frame wire 100NL), which is disposed in the picture-frame region 1NA, to the first transparent conductive layer 130, the segment having fewer sides connected to the picture-frame region 1NA could cause a signal delay. However, the liquid crystal panel 11 of this embodiment includes the metal wire 100M. Hence, the signal can be input through the metal wire 100M even to the segment having fewer sides connected to the picture-frame region 1NA. Such a feature can effectively reduce a signal delay. As can be seen, the liquid crystal panel 11 of this embodiment is suitable particularly in a case where some pixels have fewer sides connected to signal lines of the picture-frame region 1NA and to the first transparent conductive layer 130 because of the division of the first transparent conductive layer 130.

Next, the image display panel 12 will be described. The image display panel 12 preferably contains a plurality of pixels. The pixels are display units for displaying an image. When the image is displayed in colors, the pixels include, for example, red, blue, and green pixels.

The image display panel 12 may have a TFT substrate on which a plurality of TFTs are arranged. The TFT substrate may include: a plurality of gate lines provided to a support substrate and extending in parallel with one another; and a plurality of source lines provided to the support substrate through a gate insulating film and extending in parallel with one another in a direction intersecting with the gate lines. The plurality of gate lines and the plurality of source lines may be formed in a grid pattern in plan view. Each of the regions partitioned with the plurality of gate lines and the plurality of source lines corresponds to a pixel.

The support substrate is preferably a transparent substrate. Examples of the transparent substrate include a glass substrate and a plastic substrate.

An intersection of each source line and each gate line may be provided with a TFT serving as a switch element of each pixel. The TFT may have: a gate terminal connected to the gate line; a source terminal connected to the source line; and a drain terminal connected to the pixel electrode. The image display panel 12 may have, separately from the pixel electrode, a common electrode to which a common electrode voltage is applied.

The image display panel 12 may be a liquid crystal display panel, an organic light-emitting diode (OLED) panel including OLEDs, or a quantum-dot light-emitting-diode (QD-LED) panel including QD-LEDs. In this specification, OLEDs and QD-LEDs are collectively referred to as light-emitting diodes (LEDs) unless otherwise specifically distinguished.

If the image display panel 12 is a liquid crystal display panel, the image display panel 12 includes: a TFT substrate; a counter substrate disposed across from the TFT substrate; and a liquid crystal layer positioned between the TFT substrate and the counter substrate. Either the TFT substrate or the counter substrate is provided with a color filter layer.

If the image display panel 12 is either an OLED panel or a QD-LED panel, the LEDs may have any given configuration. For example, each of the LEDs includes a cathode, an electron transport layer, a light-emitting layer, a hole transport layer, and an anode, all of which are stacked on top of another in the stated order.

The cathode and the anode may be formed of any given material. Example of the material include: transparent conductive materials such as indium tin oxide (ITO), indium zinc oxide (IZO), $In_3O_3$, $SnO_2$, and $ZnO$; aluminum; silver; and an alloy of aluminum and silver.

If the LEDs are top-emission LEDs, the pixel electrode of the TFT substrate may be used as an anode, and the common electrode of the TFT substrate may be used as a cathode. The anode may be a reflective electrode formed of aluminum, silver, or an alloy of aluminum and silver. The cathode may be formed of the transparent conductive material described above.

The hole transport layer is a layer that transports holes injected from the anode to the light-emitting layer. The hole transport layer may be formed of any given material. Examples of the material include amine-based compounds such as N, N,N', N'-tetraphenylbenzidine, and derivatives thereof.

The electron transport layer is a layer that transports electrons injected from the cathode to the light-emitting layer. The electron transport layer may be formed of any given material. Examples of the material include: phenanthroline derivatives such as 2,9-dimethyl-4,7-diphe-nyl-1,10-phenanthroline (BCP); quinoline derivatives such as tris(8-quinolinolato)aluminum (Alq3); azaindolizine derivatives; oxadiazole derivatives; perylene derivatives; pyridine derivatives; pyrimidine derivatives, quinoxaline derivatives; diphenylquinone derivatives; and nitro-substi-tuted fluorene derivatives.

Between the cathode and the electron transport layer, an electron injection layer may be provided. Furthermore, between the anode and the hole transport layer, a hole injection layer may be provided. The electron injection layer may be formed of an inorganic insulating material. Examples of the inorganic insulating material include: oxides or halides of alkali metals; and oxides or halides of alkaline earth metals.

If the image display panel 12 is an OLED panel, the light-emitting layer may contain either a fluorescent material or a phosphorescent material as a light-emitting material.

If the image display panel 12 is a QD-LED panel, the light-emitting layer may contain quantum dots as a light-emitting material. The quantum dots are nanoscale semiconductor crystals (each having an average particle diameter of, for example, 2 to 10 nm) having optical properties according to quantum mechanics. Examples of the quantum dots include colloidal particles each formed of approximately 10 to 50 atoms.

First Modification of First Embodiment

Figure 7:
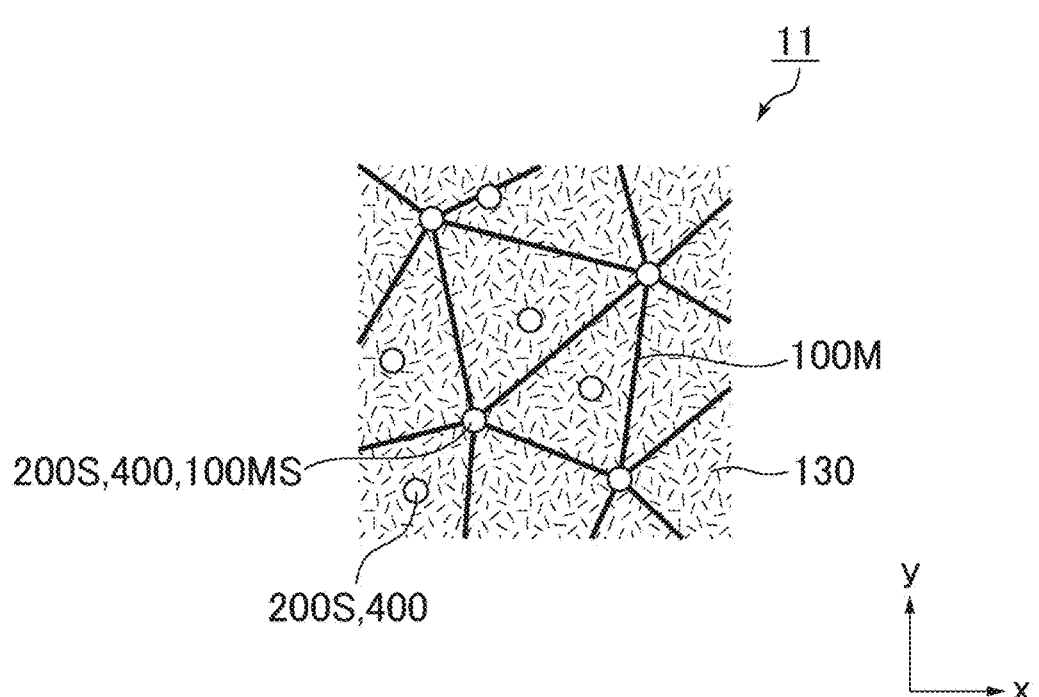
FIG. 7 is an enlarged schematic plan view of the liquid crystal panel according to a first modification of the first embodiment.

FIG. 7 is an enlarged schematic plan view of the liquid crystal panel according to a first modification of the first embodiment. FIG. 7 is an enlarged plan view of the display region 1AA. The first embodiment describes a case where the metal wire 100M is shaped into a mesh form, using the regions, all of which serve as the hubs 100MS and overlap with the plurality of spacers 400 (more specifically, both the plurality of spacers 400 and the plurality of light blocking portions 200S). Whereas, as illustrated in FIG. 7, in plan view, the metal wire 100M included in the liquid crystal panel 11 of this modification is shaped into a mesh form, using regions, a proportion of which serve as the hubs 100MS and overlap with the plurality of spacers 400 (more specifically, both the plurality of spacers 400 and the plurality of light blocking portions 200S). Such a feature makes it possible to reduce a decrease in transmittance even if the plurality of spacers 400 are provided in high density, thereby successfully reducing a signal delay.

Preferably, the metal wire 100M is shaped into a mesh form, using the regions, 1% or more and 50% or less of all of which serve as the hubs 100MS and overlap with the plurality of spacers 400 (more specifically, both the plurality of spacers 400 and the plurality of light blocking portions 200S). More preferably, the metal wire 100M is shaped into a mesh form, using the regions 1% or more and 30% or less of all of which serve as the hubs 100MS. Still more preferably, the metal wire 100M is shaped into a mesh form, using the regions 1% or more and 10% or less of all of which serve as the hubs 100MS. The liquid crystal panel 11 of this modification is preferably used when the density of the plurality of spacers 400 is high.

In the liquid crystal panel 11 of this modification, the metal wire 100M is disposed to a proportion of the patterns (the light blocking patterns) of the plurality of light blocking portions 200S. How to dispose the metal wire 100M, with which light blocking patterns are to be assigned as hubs 100MS, will be determined with a sequence below, for example.

1. Estimate a degree of decrease in aperture ratio allow-able from the specifications of the liquid crystal panel 11 and a degree of a required signal delay, and determine the number of the hubs 100MS per unit area.

2. Select as many light blocking patterns that are less likely to produce moiré patterns between the liquid crystal panel 11 and a back face display (the image display panel 12) as the hubs 100MS determined at Step 1. This includes, for example, a random disposition.

3. Dispose the metal wire 100M, using the light blocking patterns determined at Step 2 as the hubs 100MS.

As can be seen, in this modification, the metal wire 100M is disposed, using a proportion of the light blocking patterns as the hubs 100MS. The metal wire 100M disposed in the display region 1AA causes a decrease in transmittance. Hence, the metal wires 100M are disposed desirably as few as possible.

In the liquid crystal panel 11 of the first embodiment, the plurality of spacers 400 provided in high density could significantly reduce transmittance and excessively decrease an actual resistance value of the first transparent conductive layer 130. However, the liquid crystal panel 11 of this modification can reduce a decrease in transmittance even if the plurality of spacers 400 are provided in high density.

Second Modification of First Embodiment

Figure 8:
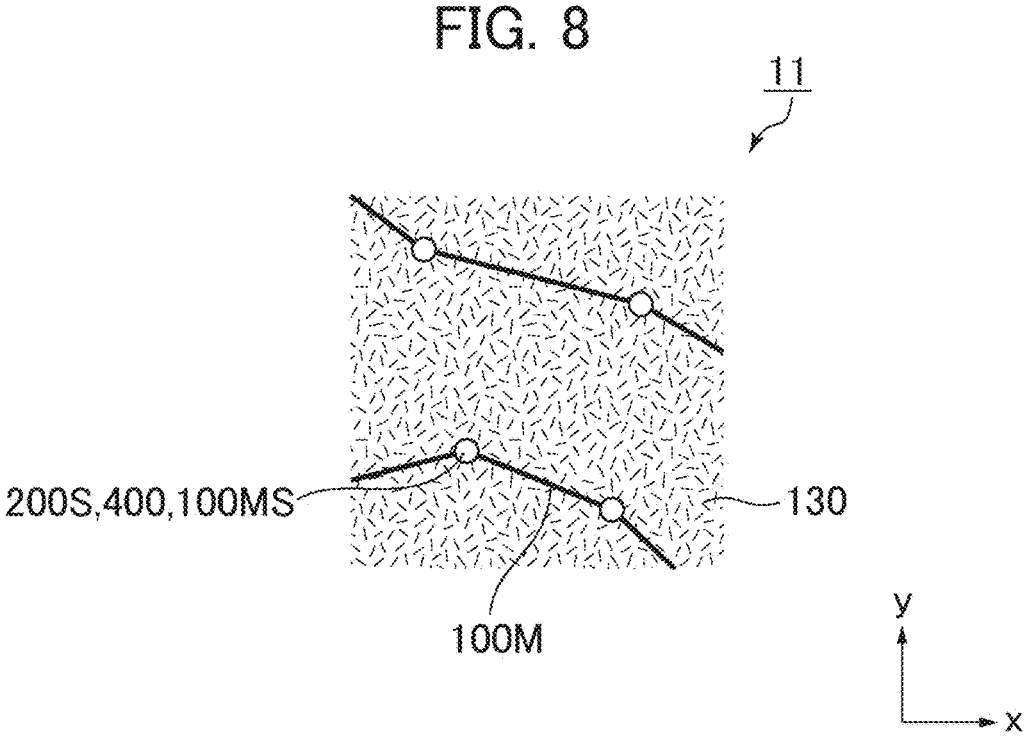
FIG. 8 is an enlarged schematic plan view of the liquid crystal panel according to a second modification of the first embodiment.
Figure 9:
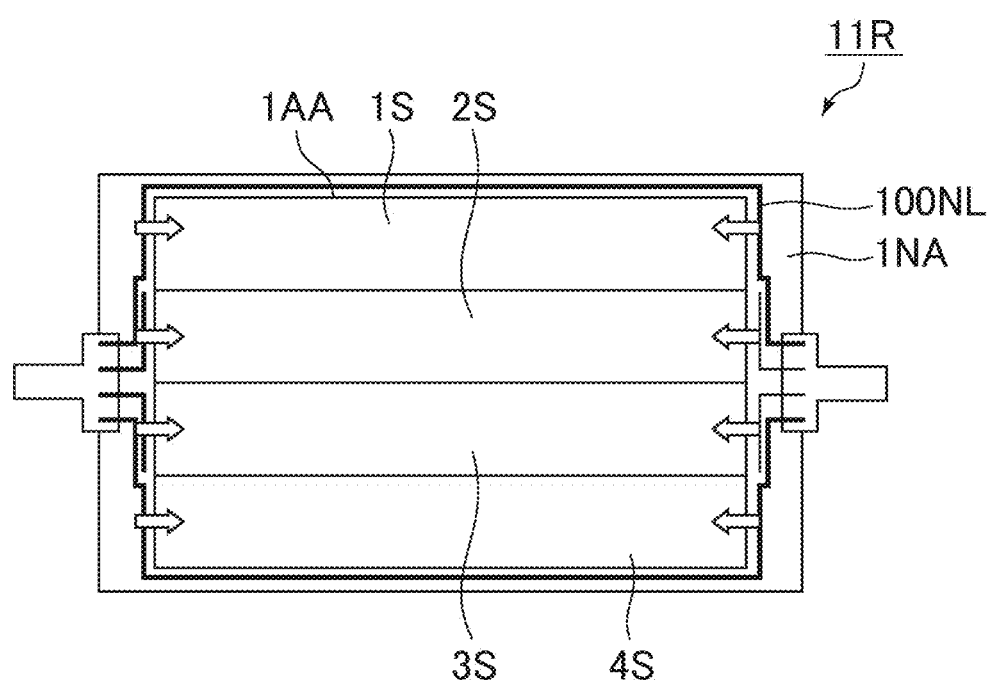
FIG. 9 is a schematic plan view illustrating a configuration of a conventional active retarder panel.

FIG. 8 is an enlarged schematic plan view of the liquid crystal panel according to a second modification of the first embodiment. FIG. 8 is an enlarged plan view of the display region 1AA. The first embodiment and the first modification of the first embodiment describe a case where, in the liquid crystal panel 11, the metal wire 100M is shaped into a mesh form, using regions serving as hubs 100MS and overlapping with the plurality of spacers 400 (more specifically, both the plurality of spacers 400 and the plurality of light blocking portions 200S). Whereas, as illustrated in FIG. 8, in plan view, the metal wire 100M included in the liquid crystal panel 11 of this modification extends only in one direction, using regions serving as the hubs 100MS and overlapping with the plurality of spacers 400 (more specifically, both the plurality of spacers 400 and the plurality of light blocking portions 200S). Such a feature makes it possible to reduce both a decrease in transmittance and a signal delay.

More specifically, the first transparent conductive layer 130 of this modification is preferably divided into three or more segments in the y-axis direction (a longitudinal direction) that is a first direction of the liquid crystal panel 11. In plan view, preferably, the metal wire 100M extends in the x-axis direction (a lateral direction) that is a second direction perpendicular to the first direction, using regions serving as the hubs 100MS and overlapping with the plurality of spacers 400 (more specifically, both the plurality of spacers 400 and the plurality of light blocking portions 200S). Desirably, the metal wire 100M does not extend in the first direction. An additional metal wire 100M could reduce transmittance. However, in this modification, the metal wire 100M is disposed only in the lateral direction. Such a feature can effectively reduce an actual resistance value of the first transparent conductive layer 130 and simultaneously reduce a decrease in transmittance.

Here, when the metal wire 100M extends in the second direction (i.e., in the x-axis direction, namely, the lateral direction of the liquid crystal panel 11), the metal wire 100M and the second direction form an angle of 50° or less. The metal wire 100M and the second direction (i.e., the x-axis direction, namely, the lateral direction of the liquid crystal panel 11) preferably form an angle θ of 45° or less. Note that if the metal wire 100M cannot be disposed at an appropriate angle because the plurality of spacers 400 are disposed at random, the angle θ shall not be limited to the above range.

In this modification, the metal wire 100M is disposed in consideration of the shape of the first transparent conductive layer 130 and the distribution of signal delays depending on the shape of the first transparent conductive layer 130. For example, the second segment 2S of the first transparent conductive layer 130 is connected to the picture-frame wire 100NL on the right and left sides of the liquid crystal panel 11, and signals are input from the connections. The signal delays in the second segment 2S are considered to be distributed in the right-left directions. Hence, if the resistance of the first transparent conductive layer 130 is reduced only in the right-left direction (i.e., in the lateral direction), an advantageous effect of reducing the signal delays can be sufficiently exhibited. Whereas, even if the metal wire 100M is disposed in the up-down direction (i.e., in the longitudinal direction), the disposition does not contribute significantly to overcoming a problem that the signal delays are observed most in the area of the second segment 2S.

Described below are advantageous effects of the present invention, with reference to examples and comparative examples. However, the present invention shall not be limited to such examples.

First Example

A liquid crystal panel 11 of this example is the liquid crystal panel 11 of the first embodiment. The liquid crystal panel 11 of this example includes the metal wire 100M. In plan view, the metal wire 100M is shaped into a mesh form, using the regions, all of which serve as the hubs 100MS and overlap with the plurality of spacers 400 (more specifically, both the plurality of spacers 400 and the plurality of light blocking portions 200S). Such a feature makes it possible to decrease effective surface resistance of the first transparent conductive layer 130 and reduce a signal delay.

Second Example

A liquid crystal panel 11 of this example is the liquid crystal panel 11 of the first example according to the first embodiment. The liquid crystal panel 11 of this example includes the metal wire 100M. In plan view, the metal wire 100M is shaped into a mesh form, using regions, a proportion of which serve as the hubs 100MS and overlap with the plurality of spacers 400 (more specifically, both the plurality of spacers 400 and the plurality of light blocking portions 200S). Such a feature makes it possible to reduce both a decrease in transmittance and a signal delay.

Third Example

A liquid crystal panel 11 of this example is the liquid crystal panel 11 of the second example according to the first embodiment. The liquid crystal panel 11 of this example includes the metal wire 100M. In plan view, the metal wire 100M extends only in one direction, using regions serving as hubs 100MS and overlapping with the plurality of spacers 400 (more specifically, both the plurality of spacers 400 and the plurality of light blocking portions 200S). Such a feature makes it possible to reduce both a decrease in transmittance and a signal delay.

The aspects of the present invention described above may be appropriately combined unless otherwise departing from the scope of the present invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal panel, comprising:
a display region and a picture-frame region provided around the display region; and
a first substrate, a second substrate disposed across from the first substrate, a liquid crystal layer, and a plurality of spacers,
wherein:
the liquid crystal layer and the plurality of spacers are disposed between the first substrate and the second substrate,
either the first substrate or the second substrate has a picture-frame wire disposed in the picture-frame region,
the first substrate has:
a transparent conductive layer, and
a metal wire extending from the picture-frame wire toward the display region, and electrically connected to the transparent conductive layer in a plurality of regions overlapping with the plurality of spacers in a plan view, and
in the plan view, the metal wire is shaped into a mesh form that is made of the plurality of regions that serves as hubs and that overlaps with the plurality of spacers in the display region, such that the metal wire branches in three or more directions from each of the hubs toward another hub.

2. The liquid crystal panel according to claim 1,
wherein either the first substrate or the second substrate includes a plurality of light blocking portions overlapping with the plurality of spacers in the plan view, and disposed closer to a viewing face than the plurality of spacers and the metal wire, and
the metal wire is electrically connected to the transparent conductive layer in regions that overlap with the plurality of spacers and the plurality of light blocking portions in the plan view.

3. The liquid crystal panel according to claim 1,
wherein the transparent conductive layer is divided into three or more segments in one direction of the liquid crystal panel.

4. The liquid crystal panel according to claim 1,
wherein, in the plan view, the metal wire uses the plurality of regions, all of which serve as the hubs and overlap with the plurality of spacers.

5. The liquid crystal panel according to claim 1,
wherein, in the plan view, the metal wire uses the plurality of regions, a proportion of which serve as the hubs and overlap with the plurality of spacers.

6. The liquid crystal panel according to claim 1, wherein the plurality of spacers is randomly disposed.

7. A display device, comprising:

the liquid crystal panel according to claim 1;

an image display panel disposed to the liquid crystal panel toward a back face; and a backlight disposed to the image display panel toward the back face.

\* \* \* \* \*